(12) United States Patent
Okamatsu et al.

(10) Patent No.: US 8,791,175 B2
(45) Date of Patent: Jul. 29, 2014

(54) LIQUID COAGULANT AND TIRE PUNCTURE SEALING MATERIAL SET

(75) Inventors: Takahiro Okamatsu, Kanagawa (JP);
Kazushi Kimura, Kanagawa (JP);
Daisuke Kanenari, Kanagawa (JP);
Takumi Sekiguchi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/699,784

(22) PCT Filed: May 19, 2011

(86) PCT No.: PCT/JP2011/061539
§ 371 (c)(1),
(2), (4) Date: Nov. 26, 2012

(87) PCT Pub. No.: WO2011/148853
PCT Pub. Date: Dec. 1, 2011

(65) Prior Publication Data
US 2013/0172465 A1 Jul. 4, 2013

(30) Foreign Application Priority Data
May 27, 2010 (JP) ................................. 2010-121355

(51) Int. Cl.
| | |
|---|---|
| B29C 73/00 | (2006.01) |
| C08K 5/053 | (2006.01) |
| C08L 7/02 | (2006.01) |
| C08L 31/04 | (2006.01) |
| C08L 33/26 | (2006.01) |
| C08K 5/05 | (2006.01) |
| C08L 75/04 | (2006.01) |
| B29C 73/16 | (2006.01) |
| B29L 30/00 | (2006.01) |

(52) U.S. Cl.
CPC ............. *C08L 75/04* (2013.01); *B29L 2030/00* (2013.01); *C08K 5/053* (2013.01); *C08L 7/02* (2013.01); *C08L 31/04* (2013.01); *C08L 33/26* (2013.01); *C08K 5/05* (2013.01); *B29C 73/163* (2013.01)
USPC ............................ 523/166; 524/386; 524/388

(58) Field of Classification Search
USPC .................................. 523/166; 524/386, 388
See application file for complete search history.

(56) References Cited

U.S. PATENT DOCUMENTS

| | | | |
|---|---|---|---|
| 6,294,622 B1 * | 9/2001 | Barajas et al. | 526/78 |
| 6,454,892 B1 | 9/2002 | Gerresheim et al. | |
| 6,889,723 B2 | 5/2005 | Gerresheim et al. | |
| 6,992,119 B2 | 1/2006 | Kojima et al. | |
| 7,037,396 B2 | 5/2006 | Naito et al. | |
| 7,745,511 B2 | 6/2010 | Okamatsu et al. | |
| 7,759,412 B2 | 7/2010 | Okamatsu | |
| 2002/0058745 A1 * | 5/2002 | Huang et al. | 524/502 |
| 2007/0203260 A1 * | 8/2007 | Okamatsu | 523/166 |
| 2009/0162609 A1 * | 6/2009 | Lee et al. | 428/145 |

FOREIGN PATENT DOCUMENTS

| | | |
|---|---|---|
| DE | 197 58 820 B4 | 5/2006 |
| DE | 602 10 501 T2 | 12/2006 |
| DE | 10 2005 031 267 A1 | 1/2007 |
| DE | 10 2006 037 488 A1 | 2/2008 |
| JP | 2000-017026 A | 1/2000 |
| JP | 2000-272022 A | 10/2000 |
| JP | 3210863 | 9/2001 |
| JP | 2004-035867 A | 2/2004 |
| JP | 2007-224232 A | 9/2007 |
| JP | 2007-224240 A | 9/2007 |
| JP | 2007-224245 A | 9/2007 |
| JP | 2007-224246 A | 9/2007 |
| JP | 2007-224248 A | 9/2007 |
| JP | 2009-041006 A | 2/2009 |
| JP | 2009-051893 A | 3/2009 |
| JP | 4245654 B2 | 3/2009 |

OTHER PUBLICATIONS

Office Action issued to corresponding German Patent Application No. 112011101806.1 on Oct. 29, 2013.

* cited by examiner

*Primary Examiner* — Edward Cain
(74) *Attorney, Agent, or Firm* — Carrier Blackman & Associates, P.C.; Joseph P. Carrier; Anne G. Sabourin

(57) ABSTRACT

Disclosed is a liquid coagulant which can be injected into the inside of a tire without removing the tire from a rim and which can prevent the scattering of a residue of a tire puncture sealing material when the tire is removed from the rim. The liquid coagulant can coagulate an emulsion that contains a natural rubber latex. The liquid coagulant comprises a urethane resin and/or an acrylic resin which has a pH value of 2.0 to 4.0 and contains a cationic functional group.

9 Claims, No Drawings

LIQUID COAGULANT AND TIRE PUNCTURE SEALING MATERIAL SET

TECHNICAL FIELD

The present invention relates to liquid coagulants and tire puncture sealant sets.

BACKGROUND ART

A known tire puncture sealant for repairing a punctured tire is obtained by blending a natural rubber latex with a tackifying resin emulsion and an antifreezing agent (see Patent Literatures 1 and 2, for instance).

The present applicant once proposed a blend of a synthetic resin emulsion and an antifreezing agent (see Patent Literatures 3 through 6, for instance).

Such a tire puncture sealant is generally injected into a tire through a portion (valve) for tire inflation, and reaches a puncture hole when the car is driven after the tire is filled with air at a specified air pressure. Rubber particles in the tire puncture sealant form aggregates in the tire by the action of a compressive or shearing force exerted on them when the rotating tire comes into contact with the ground, and the formed aggregates seal the puncture hole to enable the driving of the car.

The tire as repaired with the above tire puncture sealant has the non-aggregated tire puncture sealant (liquid components) remaining therein. The tire puncture sealant normally contains an antifreezing agent such as ethylene glycol, so that the tire puncture sealant remaining in a tire needs to be recovered when the tire is changed or at the end of use of the tire.

In order to meet such requirement, the present applicant has proposed as a coagulant for tire puncture sealants "an emulsion coagulant for coagulating a tire puncture sealant containing emulsion particles, comprising: a mineral which induces aggregation of the emulsion particles by either one or both of weakening of surface charge of the emulsion particles and formation of hydrogen bond between the mineral and the emulsion particles; and a gelation agent" (Patent Literature 7).

CITATION LIST

Patent Literature

Patent Literature 1: JP 2004-035867 A
Patent Literature 2: JP 3210863 B
Patent Literature 3: JP 2007-224245 A
Patent Literature 4: JP 2007-224246 A
Patent Literature 5: JP 2007-224248 A
Patent Literature 6: JP 2009-51893 A
Patent Literature 7: JP 4245654 B

SUMMARY OF INVENTION

Technical Problems

It, however, is necessary for the addition of the emulsion coagulant as disclosed in Patent Literature 7 to remove a tire in advance from the rim, and a tire puncture sealant remaining in the tire (hereafter also referred to as "residual tire puncture sealant") may splash when the tire is removed from the rim.

An object of the present invention is to provide a liquid coagulant capable of being injected into a tire without removing the tire from the rim, and capable of preventing a residual tire puncture sealant from splashing when the tire is removed from the rim.

Solution to Problems

As a result of diligent research, the present inventors found that the liquid coagulant with a specified pH value that comprises a urethane resin and/or an acrylic resin having a cationic functional group is capable of being injected into a tire through a valve, and capable of in-situ coagulation of a tire puncture sealant remaining within the tire, so as to complete the present invention.

In other words, the present invention provides the following (1) through (13).

(1) A liquid coagulant for coagulating an emulsion containing a natural rubber latex,
having a pH of 2.0 to 4.0; and
comprising a urethane resin and/or an acrylic resin having a cationic functional group.

(2) The liquid coagulant according to (1) as above, wherein the cationic functional group is a functional group having a quaternary ammonium ion.

(3) The liquid coagulant according to (1) or (2) as above, wherein the urethane resin has an alkylene oxide structure.

(4) The liquid coagulant according to (3) as above, wherein the urethane resin has an ethylene oxide structure.

(5) The liquid coagulant according to any one of (1) through (4) as above, wherein the acrylic resin has an acrylamide structure.

(6) The liquid coagulant according to any one of (1) through (5) as above, further comprising an antifreezing agent.

(7) The liquid coagulant according to (6) as above, wherein the antifreezing agent is at least one selected from the group consisting of ethylene glycol, propylene glycol, diethylene glycol, glycerin, methanol, ethanol, and isopropyl alcohol.

(8) The liquid coagulant according to any one of (1) through (7) as above, wherein the emulsion is a tire puncture sealant which further contains a synthetic resin emulsion and an antifreezing agent.

(9) The liquid coagulant according to (8) as above, wherein the synthetic resin emulsion is at least one selected from the group consisting of an ethylene vinyl acetate emulsion, an acrylic emulsion, and a urethane emulsion.

(10) The liquid coagulant according to (8) or (9) as above, wherein the antifreezing agent is at least one selected from the group consisting of ethylene glycol, propylene glycol, diethylene glycol, glycerin, methanol, ethanol, and isopropyl alcohol.

(11) A tire puncture sealant set, comprising: a tire puncture sealant which contains a natural rubber latex, a synthetic resin emulsion, and an antifreezing agent; and the liquid coagulant according to any one of (1) through (7) as above.

(12) The tire puncture sealant set according to (11) as above, wherein the synthetic resin emulsion is at least one selected from the group consisting of an ethylene vinyl acetate emulsion, an acrylic emulsion, and a urethane emulsion.

(13) The tire puncture sealant set according to (11) or (12) as above, wherein the antifreezing agent is at least one selected from the group consisting of ethylene glycol, propylene glycol, diethylene glycol, glycerin, methanol, ethanol, and isopropyl alcohol.

Advantageous Effects of Invention

As demonstrated below, the liquid coagulant according to the present invention is capable of being injected into a tire without removing the tire from the rim, and capable of preventing a residual tire puncture sealant from splashing when the tire is removed from the rim.

The liquid coagulant of the invention is very useful because it not only prevents splashing of a residual tire puncture sealant when a tire is removed from the rim but ensures the safety of workers by preventing pollution due to the splashing.

DESCRIPTION OF EMBODIMENTS

In the following, the present invention is described in detail.

The liquid coagulant of the invention is a liquid coagulant for coagulating an emulsion containing a natural rubber latex, which coagulant has a pH of 2.0 to 4.0, and contains a urethane resin and/or an acrylic resin having a cationic functional group.

In the present invention, the pH value of the liquid coagulant refers to a value measured at 20° C. using a pH meter. The pH of the liquid coagulant may appropriately be adjusted with an acid, with adjustment using an organic acid (formic acid, acetic acid or oxalic acid, for instance) being preferred.

While a liquid state may be based on water or a solvent, a water-based liquid state is preferable in terms of the compatibility of the liquid coagulant of the invention with the emulsion to be coagulated.

Ingredients of the inventive liquid coagulant are detailed below.

<Urethane Resin>

The urethane resin to be used in the liquid coagulant of the invention is not particularly limited as long as it has a cationic functional group.

A cationic functional group refers to a functional group having a cation.

Specific examples of the cation include an ammonium ion, a phosphonium ion, an imidazolium ion, a pyridinium ion, a pyrrolidinium ion, and a piperidinium ion. Among others, a quaternary ammonium ion is preferable because of its good handleability.

In the present invention, the urethane resin preferably has an alkylene oxide structure for the reason that the property of coagulating an emulsion containing a natural rubber latex (a tire puncture sealant described later, for instance) is further improved.

An alkylene oxide structure refers to a structural unit represented by formula (1) below. For the reason that the property of coagulating the emulsion as above is further improved, it is preferable that the urethane resin has the ethylene oxide structure as represented by formula (1) in which n is 2.

[Chemical Formula 1]

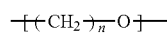

(1)

(In the formula, n is an integer of 2 to 4).

In the present invention, the method of synthesizing the urethane resin is not particularly limited. In an exemplary method, a polyisocyanate compound is reacted with a polyol compound and an amine compound such that the active hydrogen groups of the polyol compound and the amine compound are excessive with respect to the isocyanate groups (NCO groups) of the polyisocyanate compound, and an acid is added to the resultant reaction product so as to generate quaternary ammonium ions.

The polyisocyanate compound to be used for the synthesis of the urethane resin is not particularly limited as long as it has two or more isocyanate groups in the molecule.

Specific examples of the polyisocyanate compound include aromatic polyisocyanates, such as TDIs (e.g., 2,4-tolylene diisocyanate (2,4-TDI), 2,6-tolylene diisocyanate (2,6-TDI)), MDIs (e.g., 4,4'-diphenylmethane diisocyanate (4,4'-MDI), 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates, such as hexamethylene diisocyanate (HDI), trimethylhexamethylene diisocyanate (TMHDI), lysine diisocyanate, and norbornane diiscyanate (NBDI); alicyclic polyisocyanates, such as trans-cyclohexane-1,4-diisocyanate, isophorone diisocyanate (IPDI), bis(isocyanate methyl)cyclohexane ($H_6$XDI), and dicyclohexylmethane diisocyanate ($H_{12}$MDI); carbodiimide-modified polyisocyanates derived from such polyisocyanates; and isocyanurate-modified polyisocyanates derived from such polyisocyanates.

The above polyisocyanate compounds may be used alone or as a combination of two or more out of them.

Among others, tolylene diisocyanates (TDIs) are preferable because they yield urethane resins of low viscosity, and the inventive liquid coagulant including such a urethane resin is easy to handle.

The polyol compound to be used for the synthesis of the urethane resin is not particularly limited as long as it has two or more hydroxy groups.

The polyol compound is exemplified by polyether polyols and polyester polyols.

Exemplary polyether polyols include a polyol obtained by adding at least one selected from the group consisting of ethylene oxide, propylene oxide, butylene oxide, and polyoxy tetramethylene oxide to at least one selected from the group consisting of ethylene glycol, diethylene glycol, propylene glycol, dipropylene glycol, glycerin, 1,1,1-trimethylolpropane, 1,2,5-hexanetriol, 1,3-butanediol, 1,4-butanediol, and pentaerythritol.

Specifically, polyethylene glycol (polyethylene oxide), polypropylene glycol (polypropylene oxide), polypropylene triol, an ethylene oxide/propylene oxide copolymer, polytetramethylene ether glycol (PTMEG), polytetraethylene glycol, and sorbitol-type polyols are mentioned as preferred examples.

Specific examples of polyester polyols include a condensation polymer between at least one selected from the group consisting of ethylene glycol, propylene glycol, butanediol, pentanediol, hexanediol, glycerin, 1,1,1-trimethylolpropane and other low-molecular polyols, and at least one selected from the group consisting of glutaric acid, adipic acid, pimelic acid, suberic acid, sebacic acid, dimer acids and other aliphatic carboxylic acids, castor oil and other hydroxycarboxylic acids, as well as oligomer acids; and ring-opened polymers, such as propiolactone and valerolactone.

The above polyol compounds may be used alone or as a combination of two or more out of them.

Among others, polyether polyols, to be more specific, polyethylene glycol (polyethylene oxide), polypropylene glycol (polypropylene oxide), and ethylene oxide/propylene oxide copolymers are preferable because a resultant urethane resin has an alkylene oxide structure.

The amine compound to be used for the synthesis of the urethane resin is not particularly limited, while it is preferable to use a low-molecular compound having a tertiary or secondary amine because, in that case, cations (quaternary ammonium ions) are more likely to be generated. Exemplary compounds include N-methyl diethanolamine, triethylamine, N,N-dimethyl ethanolamine, diethanolamine, dimethylamine, and diethylamine.

More preferably, a compound having a tertiary amine, N-methyl diethanolamine in particular, is used because cations are even more likely to be generated.

The acid to be added to the reaction product (urethane resin) as obtained by the reaction of the polyisocyanate compound with the polyol compound and the amine compound as describe above is suitably exemplified by organic acids, such as formic acid, acetic acid and oxalic acid, because such acids not only generate cations but facilitate adjusting the pH of the inventive liquid coagulant to 2.0 to 4.0.

<Acrylic Resin>

The acrylic resin to be used in the liquid coagulant of the invention is not particularly limited as long as it has a cationic functional group.

A cationic functional group refers to a functional group having a cation, as is the case with the urethane resin as described above.

In the present invention, the acrylic resin preferably has an acrylamide structure for the reason that the polymerizability between resins is improved.

An acrylamide structure preferably refers to a structural unit represented by formula (5) below, which also serves as a cationic functional group (group with quaternary ammonium), while it may refer to a structural unit represented by one out of formulae (2) through (4) if the acrylic resin has another moiety as a cationic functional group.

[Chemical Formula 2]

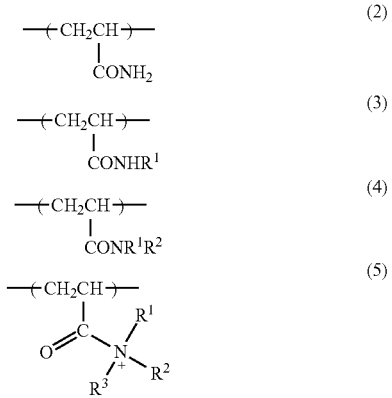

(In the formulae, $R^1$ through $R^3$ are each independently a monovalent aliphatic hydrocarbon group with 1 to 6 carbon atoms).

In the present invention, the method of synthesizing the acrylic resin is not particularly limited. In an exemplary method, an acid is added to an acrylamide polymer having an amido group, so as to generate quaternary ammonium ions.

Specific examples of the acrylamide polymer to be used for the synthesis of the acrylic resin include poly-N-ethyl acrylamide, poly-N-n-propyl acrylamide, poly-N-isopropyl acrylamide, poly-N-cyclopropyl acrylamide, poly-N,N-diethyl acrylamide, poly-N-methyl-N-ethyl acrylamide, poly-N-methyl-N-n-propyl acrylamide, poly-N-methyl-N-isopropyl acrylamide, poly-N-acryloyl piperidine, poly-N-acryloyl pyrrolidine, poly-N-acryloyl morpholine, poly-N-methoxypropyl acrylamide, poly-N-ethoxypropyl acrylamide, poly-N-isopropoxypropyl acrylamide, poly-N-ethoxyethyl acrylamide, poly-N-(2,2-dimethoxyethyl)-N-methyl acrylamide, poly-N-1-methyl-2-methoxyethyl acrylamide, poly-N-1-methoxymethylpropyl acrylamide, poly-N-di(2-methoxyethyl) acrylamide, poly-N-2-methoxyethyl-N-n-propyl acrylamide, poly-N-2-methoxyethyl-N-ethyl acrylamide, poly-N-2-methoxyethyl-N-isopropyl acrylamide, poly-N-methoxyethoxypropyl acrylamide, poly-N-tetrahydrofurfuryl acrylamide, poly-N-(1,3-dioxolan-2-yl) methyl acrylamide, poly-N-methyl-N-(1,3-dioxolan-2-yl) methyl acrylamide, poly-N-cyclopropyl acrylamide, poly-N-pyrrolidinomethyl acrylamide, poly-N-piperidinomethyl acrylamide, poly-N-2-morphorinoethyl acrylate, poly-N-2-morphorinoethoxyethyl acrylate, and methacrylates corresponding thereto.

The acid to be added to the above acrylamide polymer is exemplified by those acids as mentioned above with respect to the urethane resin.

The liquid coagulant of the invention that contains the urethane resin and/or acrylic resin (in this paragraph also referred to as "urethane resin and the like") as described above, and has a pH adjusted to 2.0 to 4.0 is excellent in property of coagulating an emulsion containing a natural rubber latex (a tire puncture sealant described later, for instance), and is capable of being injected into a tire through a valve and coagulating a residual tire puncture sealant within the tire.

The reason for an excellent coagulating property is considered to lie in that the emulsion to be coagulated is made less stable and more likely to involve aggregation by the urethane resin and the like having a cationic functional group, and that coagulation proceeds after the inventive liquid coagulant, as having a pH value falling within the range of 2.0 to 4.0, is adequately dissolved in the emulsion to be coagulated.

In view of the fact that a common tire puncture sealant contains a water-soluble solvent, such as ethylene glycol and propylene glycol, as an antifreezing agent, it is very surprising that the liquid coagulant of the invention has an effect of coagulating a residual tire puncture sealant.

<Water>

The liquid coagulant of the invention may contain water as required from the viewpoint of the capability of being injected into a tire through a valve (handleability) or the stability of the cationic functional group of the urethane resin and/or acrylic resin as described above.

In that case, the water content is preferably 50 to 300 parts by weight, and more preferably 100 to 200 parts by weight on 100 parts by weight of the urethane resin and/or acrylic resin.

If the urethane resin and acrylic resin as above are to be used in combination, the water content is based on 100 parts by weight of a combination of the urethane resin and the acrylic resin.

<Antifreezing Agent>

The liquid coagulant of the invention may contain an antifreezing agent as required.

The antifreezing agent to be contained is not particularly limited, with a conventional antifreezing agent being available.

Exemplary antifreezing agents specifically include ethylene glycol, propylene glycol, diethylene glycol, glycerin, methanol, ethanol and isopropyl alcohol, which may be used alone or as a combination of two or more out of them.

Use of propylene glycol is preferable because the viscosity of the inventive liquid coagulant can be designed to be low, and use of propylene glycol and methanol in combination is preferable because an excellent coagulating property of the inventive liquid coagulant can be maintained.

If the above antifreezing agent is to be contained, the antifreezing agent content is preferably 50 to 500 parts by weight, and more preferably 100 to 300 parts by weight on 100 parts by weight of the urethane resin and/or acrylic resin as described above.

If the urethane resin and acrylic resin as above are to be used in combination, the antifreezing agent content is based on 100 parts by weight of a combination of the urethane resin and the acrylic resin.

The following description is made on the emulsion to be coagulated with the liquid coagulant of the invention.

The emulsion is not particularly limited as long as it contains a natural rubber latex, but is preferably a tire puncture sealant further containing a synthetic resin emulsion and an antifreezing agent because the effects of the inventive liquid coagulant can fully be exerted thereon.

Ingredients of the emulsion (tire puncture sealant) to be coagulated with the liquid coagulant of the invention are detailed below.

<Natural Rubber Latex>

The natural rubber latex to be used in the emulsion, or tire puncture sealant, is not particularly limited, with a conventional natural rubber latex being available.

Exemplary natural rubber latices specifically include a latex collected by tapping Hevea brasiliensis, and a so-called "deproteinized natural rubber latex" obtained by removing proteins from a natural rubber latex.

<Synthetic Resin Emulsion>

The synthetic resin emulsion to be used in the tire puncture sealant is not particularly limited, with a conventional synthetic resin emulsion being available.

Exemplary synthetic resin emulsions specifically include an ethylene vinyl acetate emulsion, an acrylic emulsion and a urethane emulsion, which may be used alone or as a combination of two or more out of them.

As the above synthetic resin emulsions, their respective examples as mentioned in Patent Literature 7 may be used.

The synthetic resin content preferably makes the blending ratio between the solids in the natural rubber latex and in the synthetic resin emulsion (the natural rubber latex/the synthetic resin emulsion) 5/95 to 80/20, more preferably 20/80 to 50/50.

<Antifreezing Agent>

The antifreezing agent to be used in the tire puncture sealant is not particularly limited, with a conventional antifreezing agent being available.

Exemplary antifreezing agents include those as mentioned above with respect to the liquid coagulant of the invention.

The antifreezing agent content is preferably 20 to 300 parts by weight, and more preferably 50 to 200 parts by weight on 100 parts by weight of the whole solids in the natural rubber latex and the synthetic resin emulsion.

<Tackifier>

The tire puncture sealant to be coagulated with the liquid coagulant of the invention may contain a tackifier from the viewpoint of the sealing property.

The tackifier to be contained is not particularly limited, with a conventional antifreezing agent being available. Specific examples include rosin-based resins, such as a rosin resin, a polymerized rosin resin, a rosin ester resin, a polymerized rosin ester resin, and a modified rosin; terpene phenol resins; terpene resins, such as an aromatic terpene; hydrogenated terpene resins obtained by hydrogenation of a terpene resin; phenol resins; and xylene resins.

The tackifier content is preferably 10 to 150 parts by weight, and more preferably 20 to 100 parts by weight on 100 parts by weight of the whole solids in the natural rubber latex and the synthetic resin emulsion.

<Additive>

Apart from the ingredients as described above, the tire puncture sealant to be coagulated with the liquid coagulant of the invention may contain, as desired or required, various additives such as a filler, an anti-aging agent, an antioxidant, a pigment (dye), a plasticizer, a thixotropic agent, an ultraviolet absorber, a flame retardant, a surfactant (including a leveling agent), a dispersant, a dehydrating agent, and an antistatic agent.

As the above additives, their respective examples as mentioned in Patent Literature 7 may be used.

The tire puncture sealant set of the invention is as follows.

The tire puncture sealant set of the invention includes a tire puncture sealant containing a natural rubber latex, a synthetic resin emulsion and an antifreezing agent, and the liquid coagulant of the invention as described before.

The tire puncture sealant in the tire puncture sealant set of the invention is such a tire puncture sealant as described to be coagulated with the inventive liquid coagulant as described before.

The amount (as solids) of the liquid coagulant of the invention to be used when a puncture hole is sealed using the tire puncture sealant set of the invention is not particularly limited because the content of the tire puncture sealant which actually remains in the tire is often unknown, while the usage amount of the inventive coagulant is preferably about 50 to 200 parts by weight, and more preferably about 80 to 150 parts by weight on 100 parts by weight of the solids in the tire puncture sealant as used.

The tire puncture sealant set of the invention makes it possible not only to promptly repair the punctured tire of a car using the tire puncture sealant in the set so as to continue driving the car, but readily change the tire at a service station or the like in the neighborhood depending on the influence on the roadability or the lifetime of the tire by coagulating the tire puncture sealant remaining in the tire with the liquid coagulant of the invention.

EXAMPLES

The present invention is illustrated in reference to the following examples, to which the present invention is in no way limited.

<Preparation of Tire Puncture Sealant>

A tire puncture sealant was prepared by using an agitator to mix together the ingredients of the sealant that are listed in Table 1 below in the amounts (in parts by weight) as set forth in the same table.

TABLE 1

| Tire puncture sealant | |
| --- | --- |
| Emulsion 1 | 50 |
| Emulsion 2 | 50 |
| Antifreezing agent | 100 |
| Surfactant A | 1.5 |
| Surfactant B | 0.45 |
| Total amount | 201.95 |
| Solid content (%) | 27.3 |

The tire puncture sealant ingredients as listed in Table 1 are specifically as follows.

Emulsion 1: A natural rubber emulsion (HA latex; solid content, 60 wt %; manufactured by Golden Hope Corporation).

Emulsion 2: An ethylene vinyl acetate emulsion (solid content, 51 wt %; Sumikaflex S-408HQE manufactured by Sumika Chemtex Co., Ltd.).

Antifreezing agent: Propylene glycol (solid content, 100 wt %; manufactured by Wako Pure Chemical Industries, Ltd.).

Surfactant A: Dodecyl sodium sulfate (manufactured by Wako Pure Chemical Industries, Ltd.).

Surfactant B: Polyoxyethylene alkyl ether (EMULGEN 109 manufactured by Kao Corporation).

<Preparation of Liquid Coagulant>

Examples 1 Through 4, and Comparative Examples 1 Through 4

A polyisocyanate compound (TDI manufactured by Mitsui Chemicals, Inc.), a polyol compound (ethylene oxide-terminated polypropylene glycol; CMC252 manufactured by ADEKA Corporation), and an amine compound (N-methyl diethanolamine), each in the amounts (in parts by weight) as set forth in Table 2 below, were initially mixed and reacted together to obtain urethane resins each having an ethylene oxide structure and a propylene oxide structure.

To the urethane resins thus obtained, an acid (formic acid) was added in the amounts (in parts by weight) as set forth in Table 2, so as to convert a tertiary amino group into a cationic functional group (group having a quaternary ammonium ion).

The resultant urethane resins were cooled to a temperature of 10° C. or lower before water was added in the amounts as set forth in Table 2 to the resins in reaction vessels that were being agitated at a high speed of about 500 rpm, to thereby yield liquid coagulants with the solid contents and pH values as set forth in Table 2.

TABLE 2

|  | Example | | | | Comparative Example | | | |
| --- | --- | --- | --- | --- | --- | --- | --- | --- |
|  | 1 | 2 | 3 | 4 | 1 | 2 | 3 | 4 |
| Polyisocyanate compound | 20 | 20 | 20 | 20 | 20 | 20 | 20 | 20 |
| Polyol compound | 145 | 145 | 145 | 145 | 145 | 145 | 145 | 145 |
| Amine compound | 4.1 | 4.1 | 4.1 | 4.1 | 4.1 | 4.1 | 4.1 | 4.1 |
| Acid | 4.5 | 6.0 | 8.0 | 10.0 | 1.6 | 1.9 | 2.5 | 3.0 |
| Water | 212 | 213 | 215 | 218 | 208 | 208 | 210 | 210 |
| Total amount | 385.6 | 388.1 | 392.1 | 397.1 | 378.7 | 379.0 | 381.6 | 382.1 |
| Solid content (%) | 45.0 | 45.1 | 45.2 | 45.1 | 45.1 | 45.1 | 45.0 | 45.0 |
| pH | 4.0 | 3.5 | 2.5 | 2.1 | 6.8 | 6.0 | 5.6 | 4.8 |
| Coagulating property 1 | fair | good | good | good | poor | poor | poor | poor |

Examples 5 Through 8, and Comparative Examples 5 Through 8

By following the procedure of Example 1 except for the use of the urethane resin with no ethylene oxide structures that was obtained by using polypropylene glycol (manufactured by Mitsui Chemicals, Inc.) as a polyol compound in the amounts as set forth in Table 3 below, liquid coagulants with the solid contents and pH values as set forth in Table 3 were prepared.

TABLE 3

|  | Example | | | | Comparative Example | | | |
| --- | --- | --- | --- | --- | --- | --- | --- | --- |
|  | 5 | 6 | 7 | 8 | 5 | 6 | 7 | 8 |
| Polyisocyanate compound | 20 | 20 | 20 | 20 | 20 | 20 | 20 | 20 |
| Polyol compound | 115 | 115 | 115 | 115 | 115 | 115 | 115 | 115 |
| Amine compound | 4.1 | 4.1 | 4.1 | 4.1 | 4.1 | 4.1 | 4.1 | 4.1 |
| Acid | 4.5 | 6.0 | 8.0 | 10.0 | 1.6 | 1.9 | 2.5 | 3.0 |
| Water | 174 | 176 | 179 | 182 | 171 | 172 | 173 | 173 |
| Total amount | 317.6 | 321.1 | 326.1 | 331.1 | 311.7 | 313.0 | 314.6 | 315.1 |
| Solid content (%) | 45.2 | 45.2 | 45.1 | 45.0 | 45.1 | 45.0 | 45.0 | 45.1 |
| pH | 4.0 | 3.5 | 2.5 | 2.1 | 6.8 | 6.0 | 5.6 | 4.8 |
| Coagulating property 1 | fair | fair | fair | fair | poor | poor | poor | poor |

Example 9

By following the procedure of Example 1 except for the use of diethanolamine as an amine compound in the amount as set forth in Table 4 below, a liquid coagulant with the solid content and pH value as set forth in Table 4 was prepared.

Example 10

By following the procedure of Example 1 except for the use of oxalic acid as an acid in the amount as set forth in Table 4 below, a liquid coagulant with the solid content and pH value as set forth in Table 4 was prepared.

Comparative Example 9

The urethane resin as prepared in Example 1 that had no acid (formic acid) added thereto was taken in itself as a liquid coagulant.

TABLE 4

|  | Example | | Comparative Example |
| --- | --- | --- | --- |
|  | 9 | 10 | 9 |
| Polyisocyanate compound | 20 | 20 | 20 |
| Polyol compound | 145 | 145 | 145 |
| Amine compound | 3.5 | 4.1 | 4.1 |
| Acid | 4.5 | 4.5 | — |
| Water | 212 | 212 | 204 |
| Total amount | 385.0 | 385.6 | 373.1 |
| Solid content (%) | 43.8 | 43.8 | 45.3 |
| pH | 3.5 | 3.5 | 9.0 |
| Coagulating property 1 | fair | fair | poor |

Examples 11 Through 17

To the liquid coagulant as prepared in Example 2, the antifreezing agents as listed in Table 5 below (propylene glycol and methanol) were further added in the amounts as set forth in the same table, to thereby yield liquid coagulants.

TABLE 5

| | Example | | | | | | |
|---|---|---|---|---|---|---|---|
| | 11 | 12 | 13 | 14 | 15 | 16 | 17 |
| Polyisocyanate compound | 20 | 20 | 20 | 20 | 20 | 20 | 20 |
| Polyol compound | 145 | 145 | 145 | 145 | 145 | 145 | 145 |
| Amine compound | 4.1 | 4.1 | 4.1 | 4.1 | 4.1 | 4.1 | 4.1 |
| Acid | 6.0 | 6.0 | 6.0 | 6.0 | 6.0 | 6.0 | 6.0 |
| Water | 213 | 213 | 213 | 213 | 213 | 213 | 213 |
| Propylene glycol | 70 | 50 | 50 | 35 | 20 | 20 | 20 |
| Methanol | 0 | 0 | 20 | 35 | 50 | 30 | 20 |
| Total amount | 458.1 | 438.1 | 458.1 | 458.1 | 458.1 | 438.1 | 428.1 |
| Solid content (%) | 38.2 | 40.0 | 38.2 | 38.2 | 38.2 | 40.0 | 40.9 |
| pH | 3.5 | 3.5 | 3.5 | 3.5 | 3.5 | 3.5 | 3.5 |
| Coagulating property 2 | fair | fair | fair | good | good | good | good |
| Appearance at minus 20° C. | liquid | solid | liquid | liquid | liquid | liquid | liquid |

Examples 18 and 19, and Comparative Examples 10 Through 12

To an acrylic resin emulsion having an acrylamide structure (solid content, 45%; manufactured by Asahi Kasei Chemicals Corporation) in the amounts (in parts by weight) as set forth in Table 6 below, an acid (formic acid) was added in the amounts (in parts by weight) as set forth in the same table, so as to convert an amido group of the acrylic resin into a cationic functional group (group having a quaternary ammonium ion).

Then, the antifreezing agents as listed in Table 6 were added in the amounts as set forth in the same table, to thereby yield liquid coagulants with the solid contents and pH values as set forth in Table 6.

TABLE 6

| | Example | | Comparative Example | | |
|---|---|---|---|---|---|
| | 18 | 19 | 10 | 11 | 12 |
| Acrylic resin emulsion | 100 | 100 | 100 | 100 | 100 |
| Acid | 3.5 | 4.0 | 1.0 | 1.5 | 2.5 |
| Propylene glycol | 10 | 10 | 10 | 10 | 10 |
| Methanol | 10 | 10 | 10 | 10 | 10 |
| Total amount | 123.5 | 124.0 | 121.0 | 121.5 | 122.5 |
| Solid content (%) | 36.4 | 36.3 | 37.2 | 37.0 | 36.7 |
| pH | 2.5 | 2.2 | 6.8 | 5.5 | 4.3 |
| Coagulating property 2 | good | good | poor | poor | poor |
| Appearance at minus 20° C. | liquid | liquid | liquid | liquid | liquid |

<Evaluation>

(1) Coagulating Property 1

Each of the liquid coagulants as prepared in Examples 1 through 10 and Comparative Examples 1 through 9 was added, in an amount of 10 g, to 100 g of the tire puncture sealant as prepared by the above method, then the mixtures were agitated at 20° C. for five minutes before the presence of liquid components was visually examined.

If no liquid components were identified, the coagulant in question was evaluated as "good" in coagulating property. If the coagulant in question had practically no problem from the viewpoint of preventing the residual tire puncture sealant from splashing even though liquid components were slightly identified, it was evaluated as "fair." If liquid components were identified in large amounts, the coagulant in question was evaluated as "poor" in coagulating property. The evaluation results are shown in Tables 2 through 4.

(2) Coagulating Property 2

The liquid coagulants as prepared in Examples 11 through 19 and Comparative Examples 10 through 12 were each added in an amount of 60 ml within the tire without rim in which 600 ml of the tire puncture sealant as prepared by the above method had been placed.

Then, each tire was swung in its rolling directions, forward and backward, ten times (five times per direction) and each time by about 90 degrees.

Subsequently, the tires were left standing at 20° C. for five minutes before the presence of liquid components was visually examined.

If no liquid components were identified, the coagulant in question was evaluated as "good" in coagulating property. If the coagulant in question had practically no problem from the viewpoint of preventing the residual tire puncture sealant from splashing even though liquid components were slightly identified, it was evaluated as "fair." If liquid components were identified in large amounts, the coagulant in question was evaluated as "poor" in coagulating property. The evaluation results are shown in Tables 5 and 6.

(3) Appearance at Minus 20° C.

The liquid coagulants as prepared in Examples 11 through 19 and Comparative Examples 10 through 12 were visually observed on appearance at minus 20° C. (whether to appear solid or liquid). The results are shown in Tables 5 and 6.

It was found from the results as shown in Tables 2 through 6 that the liquid coagulants with pH values not falling within the range of 2.0 to 4.0 (Comparative Examples 1 through 12) were poor in coagulating property irrespective of the presence or absence of a cationic functional group.

In contrast, the liquid coagulants whose pH values fell within the range of 2.0 to 4.0 and which had cationic functional groups (Examples 1 through 19) were each found to be good in coagulating property, and capable of preventing the residual tire puncture sealant from splashing.

Among the liquid coagulants with an antifreezing agent added thereto in particular, those as prepared in Examples 11 and 13 through 19 were found to remain liquid even at minus 20° C.

The invention claimed is:

1. A tire puncture sealant set, comprising: a tire puncture sealant which contains a natural rubber latex, a synthetic resin emulsion, and an antifreezing agent; and a liquid coagulant,
   wherein said liquid coagulant has a pH of 2.0 to 4.0; and
   wherein said liquid coagulant comprises a urethane resin and/or an acrylic resin having a cationic functional group.

2. The tire puncture sealant set according to claim 1, wherein said synthetic resin emulsion is at least one selected from the group consisting of an ethylene vinyl acetate emulsion, an acrylic emulsion, and a urethane emulsion.

3. The tire puncture sealant set according to claim 1, wherein said antifreezing agent is at least one selected from the group consisting of ethylene glycol, propylene glycol, diethylene glycol, glycerin, methanol, ethanol, and isopropyl alcohol.

4. The tire puncture sealant set according to claim 1, wherein said cationic functional group is a functional group having a quaternary ammonium ion.

5. The tire puncture sealant set according to claim 1, wherein said urethane resin has an alkylene oxide structure.

6. The tire puncture sealant set according to claim 1, wherein said urethane resin has an ethylene oxide structure.

7. The tire puncture sealant set according to claim 1, wherein said acrylic resin has an acrylamide structure.

8. The tire puncture sealant set according to claim 1, wherein said liquid coagulant further comprises an antifreezing agent.

9. The tire puncture sealant set according to claim 8, wherein said antifreezing agent is at least one selected from the group consisting of ethylene glycol, propylene glycol, diethylene glycol, glycerin, methanol, ethanol, and isopropyl alcohol.

* * * * *